Jan. 24, 1967 E. WYSS ETAL 3,299,490
CUTTING TOOL, IN PARTICULAR TOOL HOLDER CLAMP CONSTRUCTION
Filed March 29, 1965

United States Patent Office 3,299,490
Patented Jan. 24, 1967

3,299,490
CUTTING TOOL, IN PARTICULAR TOOL HOLDER CLAMP CONSTRUCTION
Edgar Wyss, Morigen, and Pierre Davoli, Biel, Switzerland, assignors to Vereinigte Drahtwerke A.G., Biel, Switzerland
Filed Mar. 29, 1965, Ser. No. 443,541
Claims priority, application Switzerland, Apr. 1, 1964, 4,131/64
2 Claims. (Cl. 29—96)

The present invention has reference to an improved cutting tool, particularly a tool holder clamp construction incorporating at least one indexible insert cutting tool or multi-sided throwaway cutting tip, in other words, a cutter or cutting tip possessing a plurality of cutting edges.

It is a primary object of the present invention to provide an improved tool holder clamp construction which effectively protects the cutting edges of the cutting tool.

A further more specific object of the present invention relates to the provision of an improved tool holder clamp construction for a throwaway cutting tip incorporating means for protecting the rear edge portion of the momentary employed cutting edge as well as the portion of another cutting edge of such cutting tip bounding said rear edge portion.

According to an important aspect of the present invention, each throwaway cutting tip is provided with a cover member or element for protecting the rear edge portion of the momentary employed cutting edge serving as the main cutter or main cutting edge as well as the portion of a cutting edge of said cutting tip adjoining or neighboring at such rear edge portion. Moreover, there is also provided a chip breaker which is a separate member from the cover element, so that the chip breaker can be positioned upon the throwaway cutting tip completely independent of the position of the cover element.

Figure 1:
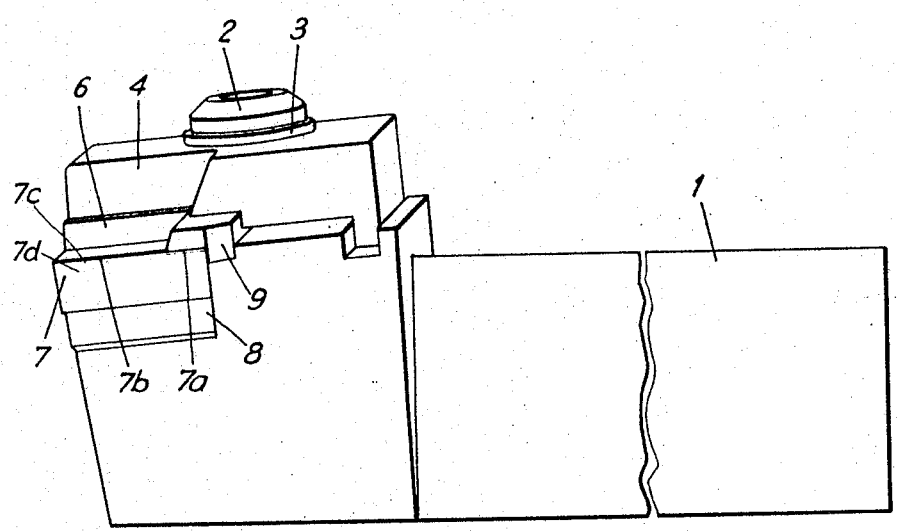
Figure 2:
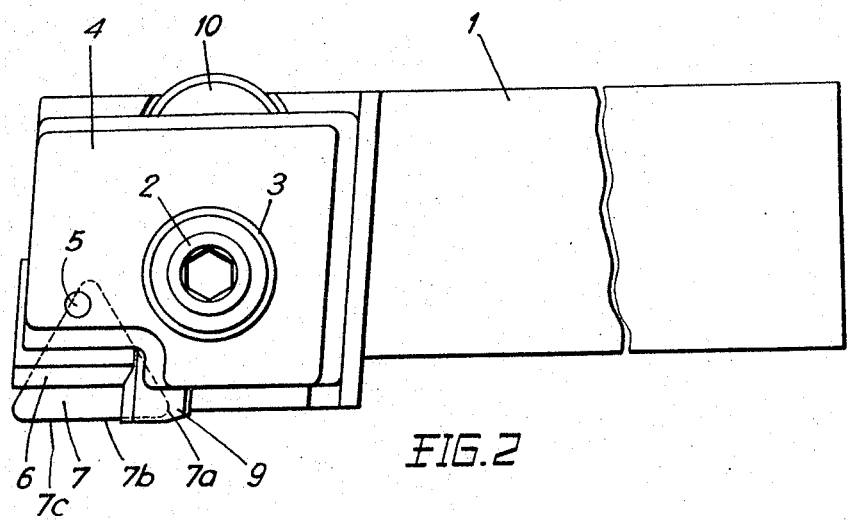

Other features, objects and advantages of the invention will become apparent by reference to the following detailed description and drawing, depicting an exemplary embodiment of a tool holder clamp construction here provided with a single throwaway cutting tip, and in which:

FIGURE 1 is an elevational view of the tool holder clamp construction designed according to the teachings of the present invention; and FIGURE 2 is a top plan view of the tool holder clamp construction of FIGURE 1.

Describing now the drawing, it will be understood reference numeral 1 designates a tool holder clamp body member. By means of a screw member 2 or equivalent expedient and a support disk or washer 3 a clamping plate 4 together with a chip breaker plate 6 connected to such clamping plate 4 by means of a pin 5 is pressed onto a multi-sided throwaway cutting tip or indexible insert cutting tool 7. This cutting tip or tool 7 defines a cutter or cutting plate 7d possessing a number of cutter side means, such as 7b for instance, each having a cutting edge, such as edge 7c for instance. The cutter or cutting edges of the cutter plate 7d can be successively applied to the workpiece or otherwise being processed and such cutter plate 7d is preferably formed of a suitable hard metal or ceramic. The throwaway cutting tip 7 bears against a support or base plate 8 connected to the body member 1 and preferably also formed of hard metal. It will be appreciated that upon loosening the screw member 2 it is possible to remove the throwaway cutting tip or insert cutting tool 7 and to again insert such in a different position of use. It is also possible to forwardly and rearwardly displace the chip breaker plate 6 in stepless manner towards and away from the momentary employed main cutter means of the throwaway cutting tip 7—in this case cutter side 7b—by rotating an eccentric wheel 10. The above-described physical structure is known to the art.

Now, what is considered to be one of the more important aspects of the present invention is the provision of a cover element or member 9 at the tool holder clamp construction for protecting the rear edge 7a of the momentary employed main cutter means 7b as well as to protect the adjoining portion of the neighboring cutting edge of the throwaway insert tool bounding at this rear edge 7a from wear by the chips, particularly when using the entire or almost the entire length of the main cutter means 7b.

As possible variants of the invention the cover element 9 could be connected to the clamping plate 4 or manufactured together with the latter as a unitary piece, or it could be connected or constructed at the tool holder body 1.

It will be appreciated that such a cover element 9 (including the illustrated manner of attachment and the above-mentioned variants) could be provided for all of the throwaway cutting tips of a cutter tool, for example a miller, possessing a number of such throwaway cutting tips.

While there is shown and described present preferred embodiments of the invention it is to be distinctly understood that the invention is not limited thereto but may be otherwise variously embodied and practised within the scope of the following claims.

What is claimed is:
1. A tool holder clamp construction comprising at least one indexible multi-sided throwaway cutting tip having at each side a cutting edge, a chip breaker arranged upon said throwaway cutting tip, means provided for each throwaway cutting tip disposed to protect the rear portion of that cutting edge which is in position of use and momentarily functioning as the main cutting edge as well as protecting an adjoining portion of another cutting edge neighboring said main cutting edge, said protecting means being formed as a separate member from said chip breaker, to enable said chip breaker to be positioned upon said throwaway cutting tip completely independent of the position of said protecting means.

2. A tool holder clamp construction comprising at least one indexible multi-sided throwaway cutting tip having at each side a cutting edge, a chip breaker arranged upon said throwaway cutting tip, a cover element provided for each throwaway cutting tip disposed to protect the rear portion of that cutting edge which is in position of use and momentarily functioning as the main cutting edge as well as protecting an adjoining portion of another cutting edge neighboring said main cutting edge, said cover element and said chip breaker being completely separate members, to enable said chip breaker to be displaced and positioned at said throwaway cutting tip in any desired location, completely independent of the position of said cover element, to thereby afford the aforesaid protection of said throwaway cutting tip in every possible position of use of said chip breaker.

References Cited by the Examiner
UNITED STATES PATENTS
2,897,580   8/1959   Huber _____ 29—96

WILLIAM W. DYER, JR., *Primary Examiner.*
HARRISON L. HINSON, *Examiner.*